United States Patent [19]

Abraham

[11] 3,941,537

[45] Mar. 2, 1976

[54] ROTARY SPRAY CLEANER FOR CIRCULAR DIES

[75] Inventor: John C. Abraham, Metamora, Ill.

[73] Assignee: Caterpillar Tractor Co., Peoria, Ill.

[22] Filed: Mar. 24, 1975

[21] Appl. No.: 561,135

[52] U.S. Cl. ............... 425/228; 425/229; 164/149; 164/158; 118/316; 239/66; 239/261; 239/264

[51] Int. Cl.$^2$.. B29C 1/04; B05C 5/00; B05B 15/10; B05B 3/06

[58] Field of Search ................... 425/225, 228, 229; 164/149, 158; 118/316, 317; 239/66, 243, 245, 248, 261, 263, 264, 251; 134/44, 50, 56 R

[56] References Cited
UNITED STATES PATENTS

| | | | |
|---|---|---|---|
| 2,245,575 | 6/1941 | Court | 239/248 X |
| 3,248,762 | 5/1966 | Wagner | 164/158 |
| 3,426,973 | 2/1969 | Ordway | 239/66 |
| 3,720,375 | 3/1973 | Kumaoka | 239/261 X |
| 3,731,878 | 5/1973 | Lubetzky et al. | 239/261 X |
| 3,801,251 | 4/1974 | Coscia | 425/229 |
| 3,814,322 | 6/1974 | Waldrum | 118/316 X |

FOREIGN PATENTS OR APPLICATIONS

| | | | |
|---|---|---|---|
| 811,873 | 4/1959 | United Kingdom | 164/158 |

*Primary Examiner*—Robert S. Ward, Jr.
*Attorney, Agent, or Firm*—Phillips, Moore, Weissenberger Lempio & Strabala

[57] ABSTRACT

Briefly the invention comprises a rotary sprayer useful for cleaning circular dies. The rotary sprayer comprises a pair of rotary unions each including a base portion, a cylinder portion upraised therefrom and a hollow rotor portion rotatingly mounted in said cylinder portion thereof, said unions being positioned with their bases in opposed adjacent relation. A pair of hollow spray arms, the hollow portions of which each communicate with the hollow portion of one of said rotors, each of said spray arms ending in a nozzle also form a part of the invention. A pair of passages, one through the cylinder portion of each of said unions, said passages each communicating with the hollow portion of the respective rotor form another part of the rotary sprayer of the invention. Also part of the invention are means for supplying a pressurized gas to each of said passages or a pressurized liquid to each of said passages and means for preventing simultaneous supply of air and liquid to each of said passages.

6 Claims, 5 Drawing Figures

3,941,537

ROTARY SPRAY CLEANER FOR CIRCULAR DIES

BACKGROUND OF THE INVENTION

1. Field of the Invention

The invention is concerned with a sprayer and more particularly a rotary sprayer useful for cleaning circular dies.

2. Prior Art

Rotary sprayers as such are well known for a number of uses such as watering lawns and the like. Sprayers for cleaning dies have, in general, however not been of the rotary types; instead the sprayers normally used for cleaning dies have been fixed position sprayers wherein a desired liquid is sprayed onto a number of fixed positions on the die and the liquid sprayed onto the die by the fixed position sprayer is blown off using an air blast or the like.

The present invention is concerned with a rotary sprayer which is useful for cleaning circular dies and which exhibits a number of advantages over the prior art non-rotary sprayers. The rotary sprayer of the present invention, for example, sprays the entire surface of the die rather than only fixed positions thereon whereby uniform cleaning lubricant distribution is obtained which leads to better cleaning and which prevents spot cooling of the mold which can lead to uneven curing within the mold. Also, with the rotary sprayer of the present invention less cleaning lubricant is used than in the prior art fixed sprayers since with said rotary sprayer, as will become apparent in following, it is not necessary to spray a cleaning lubricant onto the mold face each time the mold is opened. Further, the rotary sprayer of the present invention is adjustable for use with different sized circular molds by simply varying the size of the rotary arms thereof.

SUMMARY OF THE INVENTION

Briefly, the invention comprises a rotary sprayer useful for cleaning circular dies. The rotary sprayer of the present invention comprises a pair of rotary unions each including a base portion, a cylinder portion upraised therefrom and a generally cylindrical rotor portion including a fluid pathway therethrough rotatingly mounted in said cylinder portion thereof, said unions being positioned with their bases in opposed adjacent relation. A pair of pipes (hollow spray arms) form a part of the rotary sprayer. The pipes spray arms each communicate with the fluid pathway of one of the rotors. Each of the spray arms ends in a nozzle adapted to be aimed at the face of the circular die. A pair of passages are provided, one through each of the unions, the passages each communicating with the fluid pathway of the respective rotor. Means are provided for supplying a pressurized gas, usually air, to each of the passages. Means are also provided for supplying a pressurized liquid to each of the passages. Additionally, means are provided for preventing simultaneous supply of gas and liquid to each of the passages.

BRIEF DESCRIPTION OF THE DRAWINGS

The invention will be better understood by reference to the drawings wherein like numbers denote like parts throughout and wherein.

DETAILED DESCRIPTION OF THE PREFERRED EMBODIMENT

Figure 1:
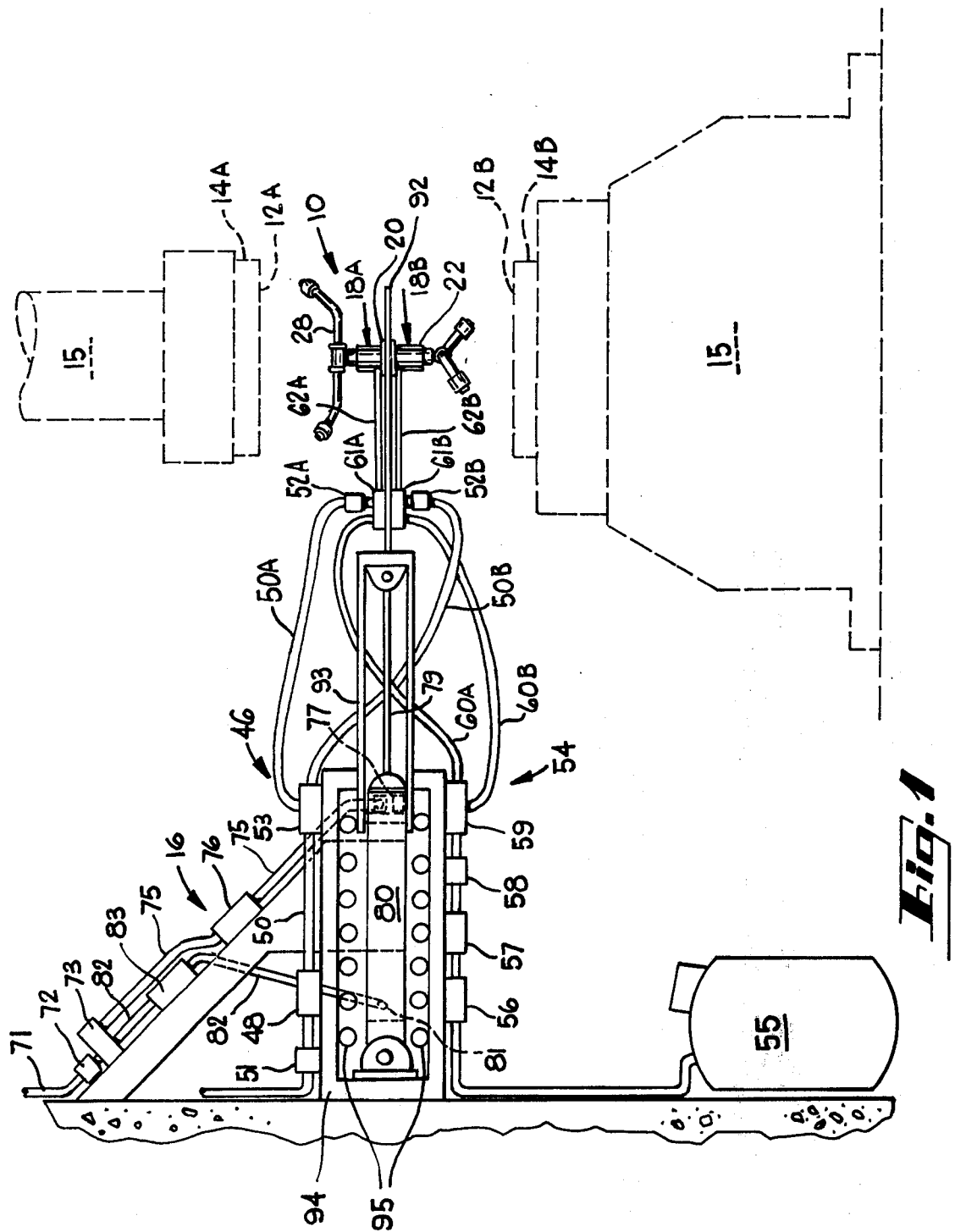
FIG. 1 schematically illustrates a preferred embodiment of the invention.

The rotary sprayer of the present invention is illustrated in FIG. 1 and referred to generally by the numeral 10. The rotary sprayer is located, when in spraying position, between a pair of die faces 12A and 12B of the respective circular dies 14A and 14B. Opening and closing of the dies 14A and 14B is provided by a conventional ram press 15 illustrated in phantom. Means illustrated in FIGS. 1 and 5, and denoted generally by the numeral 16 are provided for moving the rotary sprayer 10 in and out between the die faces 12A and 12B as the die faces alternately open and close.

Figure 3:
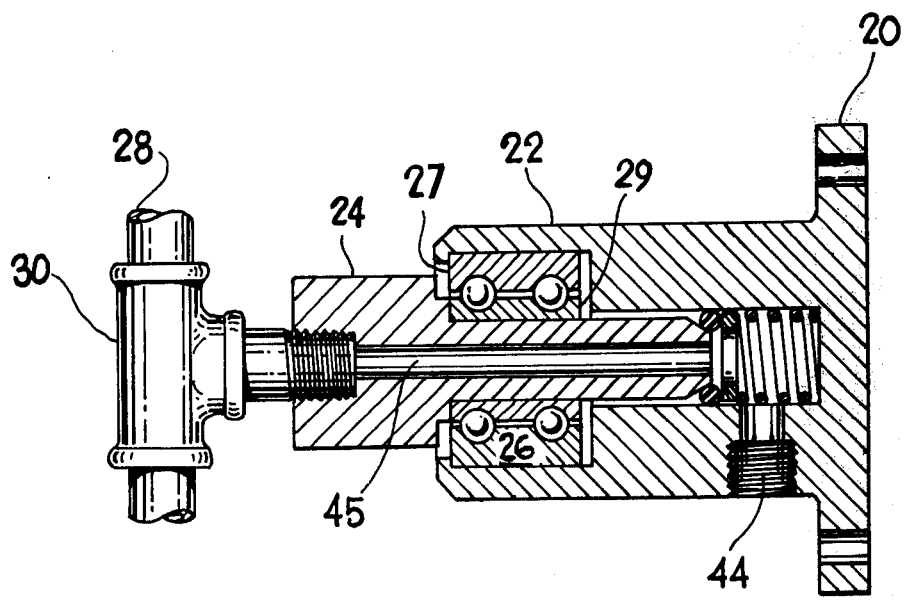
FIG. 3 illustrates in a partially cut away view one of the rotary unions of the invention.

The rotary sprayer 10 includes a pair of symmetrically placed commercially available rotary unions 18A and 18B. As illustrated in FIG. 3, each union includes a base portion 20 with a cylinder portion upraised therefrom and a coaxially hollow generally cylindrical rotor 24, rotatingly mounted in said cylinder portion as by the ball bearing 26, the outer race 27 of which is supported by the cylinder portion 22 of the unions 18A and 18B and the inner race 29 of which supports the hollow rotor 24. As will be most apparent from FIG. 1, the unions are positioned with their bases 20 in opposed adjacent relation for spraying the opposing faces 12A and 12B of the dies 14A and 14B.

Figure 2:
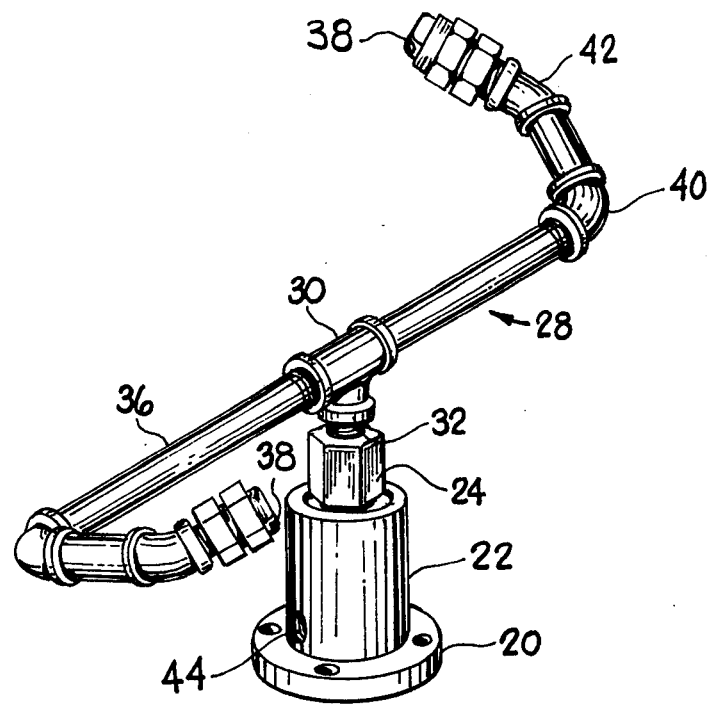
FIG. 2 illustrates in perspective one of the rotary unions of the invention, which union has rotatingly mounted thereto a hollow spray arm.

Detachably attachable to the hollow rotor 24 of each of the unions 18A and 18B are a pair of hollow spray arms or pipes 28. FIG. 2 illustrates the connection of a pipe 28 to a hollow rotor 24 with the center or hollow portion of the pipe being connected to the hollow portion of the rotor 24, via a T-fitting 30 and an appropriate nipple 32. In the particular preferred embodiment as illustrated, the pipe 28 includes the two arms 36 and each of said arms end in a nozzle 38 which is angled so as to direct a flow of gas or liquid therethrough and onto a respective die face 12A or 12B. Pressurized flow of gas or liquid through the hollow rotor 24 and hence through the pipe 28 and the nozzles 38, imparts a rotating motion to the pipe 28 in the usual and well understood manner. It is clear, in particular from FIG. 2, that the lengths of the arms 36 can be varied so as to make the rotor adaptable for different sized circular die faces. Similarly, the particular angles at which the nozzles 38 are aimed can be varied as by adjusting the angles of the bent fittings 40 and/or 42. The passage 44 in the cylinder portion 22 of the unions 18A and 18B, as is most clear from FIG. 3, communicate with the hollow portion 45 of the rotor 24.

Referring now to FIG. 1, means 46 are provided for supplying a pressurized gas to the passage 44 of each of the unions 18A and 18B, generally pressurized air from a pump such as a typical plant air supply pump (not illustrated) connected via a solenoid operated valve 48 and pipes 50, 50A and 50B to the respective passage 44 of the unions 18A and 18B. A pressure regulator valve 51 is provided between the plant air supply pump and the solenoid operated valve 48. A pair of check valves 52A and 52B are provided in the pipes 50A and 50B leading from a gas input manifold 53 downstream flowwise from the solenoid operated valve 48 to the pipes 50A and 50B to prevent the pumping of liquid into the solenoid operated valve 48 and into the plant air supply.

Also shown in FIG. 1 are means 54 which are provided for supplying a pressurized liquid to each of the passages 44 in the respective unions 18A and 18B. The pressurized liquid suppplying means comprise a liquid pump 55, for example, a commercially available airless piston pump, which is normally used to pump a liquid mold release agent, such as for example zinc sterate, silicon, tetrafluoroethylene, emulsified polyethylene, or a fluorotelemer dispersion such as a product sold under the trademark Vydax WD by E. I. Dupont de Nemours & Co. into the passages 44 and thence onto the die faces 12A and 12B. The operation of the pump 55 is controlled by a solenoid valve 56. Liquid leaving the solenoid valve 56 travels via metering (needle) valve 57, check valve 58, liquid manifold 59 and lines 60A and 60B to the passages 44 of the respective unions 18A and 18B.

A pair of gas-liquid interchange manifolds 61A and 61B accept the flow from one or the other of the lines 50A and 60A and 50B and 60B, respectively. A pair of lines 62A and 62B connect the interchange manifolds 61A and 61B to the passages 44 of the rotary unions 18A and 18B.

Figure 4:
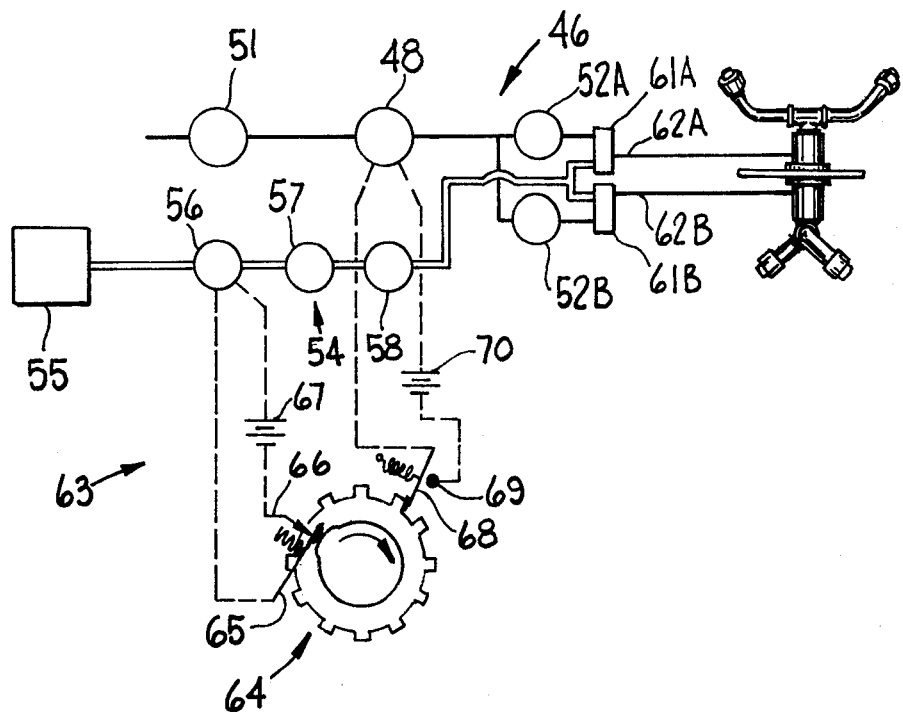
FIG. 4 schematically illustrates the pumping, valving and control means for alternately supplying a pressurized liquid and a pressurized gas flowing through the nozzles of the spray arms.

Means are provided as illustrated in FIG. 4 namely the control means 63, for preventing simultaneous supply of gas and liquid from the solenoid valves 48 and 56 respectively while providing supply of one of gas and liquid from one of said solenoid valves when the die faces 12A and 12B are apart. The particular preferred control means illustrated includes means for operating the solenoid valves 48 and 56 and is adjusted so that the valves 48 and 56 are not opened at the same time. More particularly, the control means 63 includes a rotary disc timer 64 (or for example, a solid state timer sold under the trademark Accuflex by Eagle Signal Industrial Controls Division of Gulf & Western Manufacturing Company, Davenport, Iowa), for keeping track of the number of times that the dies 14A and 14B come apart. The timer 64 is coupled to the opening and closing of the dies 14A and 14B and advances one position for each cycle of the dies 14A and 14B. The solenoid valves 48 and 56 are opened and closed as determined by the rotational position of the timer 64 in a desired sequence. For example, the solenoid valve 48 may be opened for 20 or 30 openings of the dies 14A and 14B while the solenoid valve 56 is closed and then the solenoid valve 48 will be closed and the solenoid valve 56 will be opened for one cycle of opening of the dies 14A and 14B. Activation of the solenoid valve 56 (which is a normally closed valve) occurs via shorting of a pair of contacts 65 and 66 to one another via the rotary disc timer 64 whereby power is supplied by a DC power supply 67. Similarly, activation of the solenoid valve 48 (which is also a normally closed valve) occurs via shorting of a pair of contacts 68 and 69 to one another, again via the timer 64, whereby power is supplied by a DC power supply 70. In this manner, the amount of liquid release agent used is minimized and yet effective cleaning of the die faces 12A and 12B results.

Figure 5:
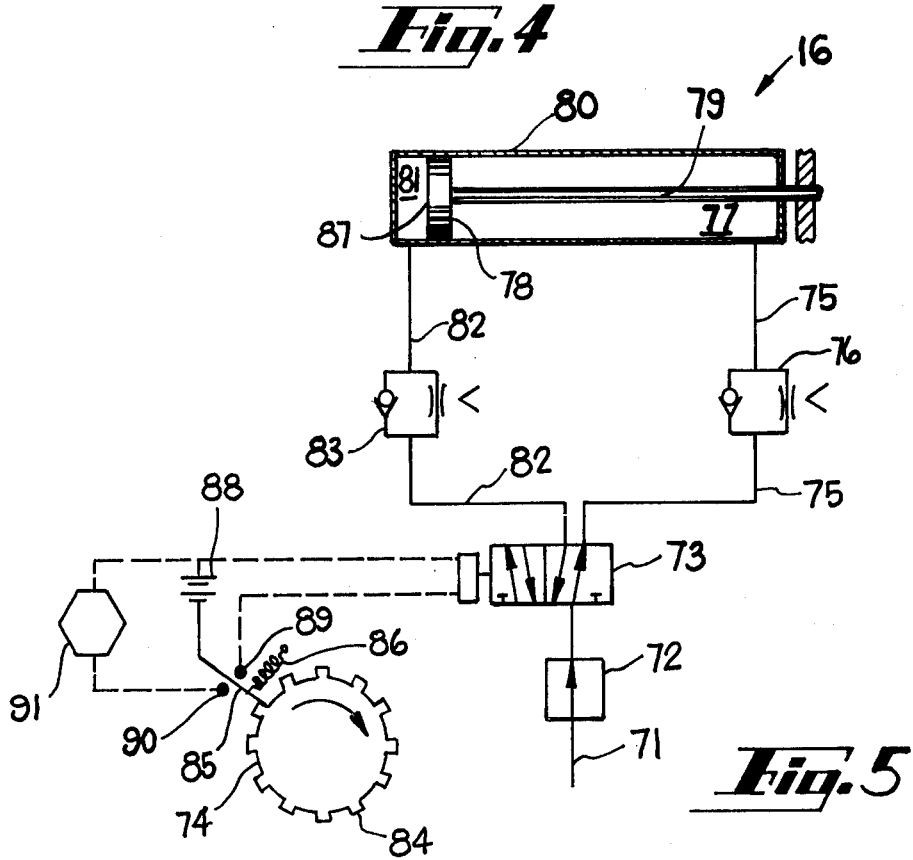
FIG. 5 schematically illustrates means for moving the embodiment of FIG. 1 in and out between the pair of opening and closing circular dies.

FIGS. 1 and 5 illustrate in detail the means 16 for synchronous moving of the rotary sprayer 10 in and out between the dies 14A and 14B as said dies 14A and 14B alternately open and close. Gas pressure, generally pressurized air from a typical plant air supply pump (not illustrated) is supplied via a line 71 to a pressure regulator 72, thence to a two-position four-way solenoid valve 73. The direction of gas flow from the solenoid valve 73 is controlled by the rotational position of a rotary switch 74, said switch 74 rotating in synchronization with the rotation of the rotary disc timer 64 and generally being mounted on a common shaft therewith. When the rotary switch 74 is in one position, e.g., the position illustrated in FIG. 5, flow of gas proceeds through the line 75 and metering-check valve 76 therein to a chamber 77 whereby pressure is exerted against a forward side 78 of a reciprocating piston 79 within a pneumatic cylinder 80. Meanwhile, pressure in a chamber 81 is leaked therefrom via conduit 82 and metering-check valve 83, the rate of leakage and hence the rate of retraction of the piston 79 being determined by the metering setting of the metering-check valve 83. Gas exiting the metering-check valve 83 then proceeds via conduit 82 to solenoid valve 73 and therethrough to the atmosphere. When the switch 74 rotates to its next position, one of a plurality of fingers 84 thereon pushes a switch 85 against a spring 86 thus activating the solenoid valve 73 to connect the output of the pressure regulator 72 go the conduit 82, through the meteringcheck valve 83 in conduit 82 to chamber 81. Pressurized gas thus exerts a force upon a back side 87 of the piston 79. Meanwhile, the line 75 is connected via the solenoid valve 73 to the atmosphere. Gas leakage then proceeds from the chamber 77 via the line 75 and through the metering-check valve 76 which controls the rate of leakage and hence the rate of extension of the piston 79, and through the solenoid valve 73 to the atmosphere. As the rotary switch 74 rotates in synchronization with the opening and closing of the dies 14A and 14B the above described reciprocating-extending cycle repeats. A DC power supply 88 provides power for activation of the solenoid valve 73 when the switch 85 touches a contact 89. When the switch 85 touches a contact 90 (when the piston 79 is retracted as illustrated in FIG. 5) the DC power supply 88 provides power to a press control 91 for controlling the operation of the ram press 15 and thereby closing the dies 14A and 14B. Thus, the dies 14A and 14B are closed when the piston 79 is retracted and are opened when power to the press control 91 is interrupted as the solenoid valve 73 is shifted rightwardly (in FIG. 5) to extend the piston 79. The rotary sprayer 10 is carried by an extension 92 of the piston 79 and thus proceeds in and out between the dies 14A and 14B as they open and close.

The piston 79 is constrained to move linearly by the guide 93 which extends from the front end thereof as shown in FIG. 1 and slidingly fits within the frame 94 upon the support rollers 95.

As will be noted, when the rotary sprayer 10 is in position between the die faces 12A and 12B, the nozzles 38 are in position to spray air or liquid onto the die faces 12A and 12B and thereby to clean these die faces.

While the invention has been described in connection with specific embodiments thereof, it will be understood that it is capable of further modification, and this application is intended to cover any variations, uses or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

That which is claimed is:

1. A molding apparatus with means for cleaning the dies thereof, comprising:
   a pair of rotary unions each including a base portion, a portion upraised from said base portion, and a rotor rotatably mounted in said upraised portion and including a fluid pathway therethrough, said unions being positioned with their bases in opposed adjacent relation;
   a pair of pipes each of which communicate with the fluid pathway of one of said rotors, each of said pipes ending in a nozzle;
   a pair of passages, one through each of said unions, said passages each communicating with the fluid pathway of the respective rotor;
   means for moving said pair of unions in and out between a pair of opening and closing dies and into position for said nozzles to each spray one of said die pair;
   means for supplying a pressurized gas to each of said passages;
   means for supplying a pressurized liquid to each of said passages; and
   means for preventing simultaneous supply of gas and liquid to each of said passages.

2. A molding apparatus as in claim 1, including means for synchronizing the moving of said unions in and out between said pair of dies with the opening and closing, respectively, of said pair of dies.

3. A molding apparatus as in claim 2, wherein said simultaneous supply preventing means include means for preventing supply of one of said gas and said liquid responsive to the number of openings and closings of said dies.

4. A molding apparatus as in claim 3, wherein said pressurized gas supplying means comprises a solenoid valve and said pressurized liquid supplying means comprises a solenoid valve.

5. A molding apparatus as in claim 4, wherein each of said pipes include a T-fitting communicating with said hollow portion of one of said rotors and a pair of arms leading from said T-portion, each of said arms ending in a nozzle.

6. A molding apparatus with cleaning means therefore, comprising:
   a pair of rotary unions, each including a base portion, an upraised portion from said base portion and a rotor rotatably mounted in said upraised portion and including a fluid pathway therethrough, said unions being positioned with their bases in opposed adjacent relation;
   a pair of pipes each of which communicate with the fluid pathway of one of said rotors, each of said pipes ending in a nozzle;
   passage means through said pair of unions communicating with the fluid pathway of each rotor;
   means for moving said pair of unions in and out between a pair of opening and closing dies and into position for said nozzles to each spray one of said die pair;
   means for supplying a pressurized gas to said passage means;
   means for supplying a pressurized liquid to said passage means; and
   means for preventing simultaneous supply of gas and liquid to said passage means.

\* \* \* \* \*